Sept. 14, 1954  J. S. ZIMMER  2,689,105
RESILIENT MOUNT
Filed July 8, 1950

Inventor:
John S. Zimmer,
by Claude S. Nott.
His Attorney.

Patented Sept. 14, 1954

2,689,105

UNITED STATES PATENT OFFICE 2,689,105

RESILIENT MOUNT

John S. Zimmer, Scotia, N. Y., assignor to General Electric Company, a corporation of New York Application July 8, 1950, Serial No. 172,704

5 Claims. (Cl. 248—358)

My invention relates to resilient mountings for protecting a supported body or mass from shock and vibration.

The invention is especially applicable to mountings for electric control apparatus, such as voltage regulators and the like, used in aircraft.

It is a general object of my invention to provide new and improved resilient mounting means for effectively protecting a supported body or mass from the effects of vibration and shock.

It is a further object of my invention to provide a new and improved resilient mount which is equally effective in any position.

It is still another object of my invention to provide new and improved resilient mounting means which is highly damped and has substantially no tendency to initiate or support torsional oscillation of the supported body in any plane.

Figure 1:
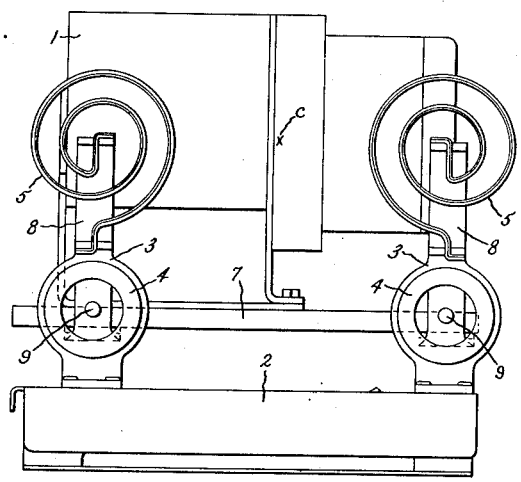
Figure 2:
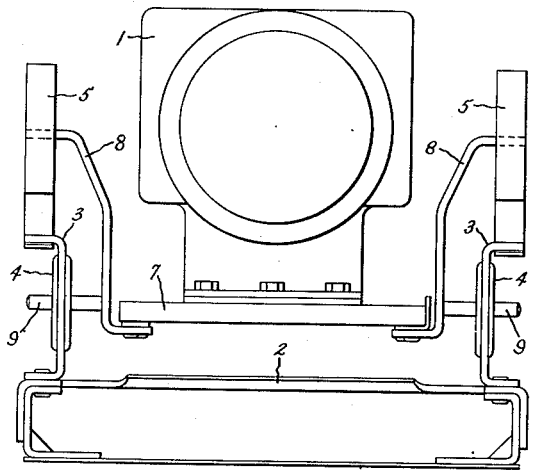
Figure 3:
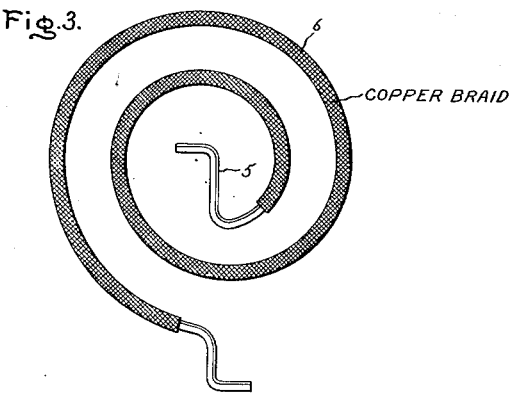

My invention itself will be more fully understood and its various objects and advantages further appreciated by referring now to the following detailed specification taken in conjunction with the accompanying drawing, in which Fig. 1 is a side elevational view of a resilient mount embodying my invention and supporting an electric control device, such as a voltage regulator or the like; Fig. 2 is an end elevational view of the apparatus shown at Fig. 1; and Fig. 3 is a side elevational view of a modified form of mounting spring which may be utilized in conjunction with my invention.

Referring now to the drawing, and more particularly to Figs. 1 and 2, I have there shown an electrical control device 1 flexibly supported upon a resilient mount embodying my invention. In the illustrated embodiment of the invention, the mount comprises a fixed base member 2 of substantially rectangular configuration in top or plan view and having attached at each corner thereof a fixed upright mounting bracket 3. Each fixed mounting bracket 3 is provided with a circular aperture intermediate its ends in which is fixed a rubber grommet or eyelet 4. These apertures and eyelets serve as limiting stops for the body 1, as will be more fully explained hereinafter.

The top end of each fixed mounting bracket 3 is bent over to provide a mounting foot, and upon each such foot is fixed an open coil planar spiral spring 5. Each spiral spring 5 has its outer end attached to the associated mounting bracket 3 and is disposed with the plane of the spring perpendicular to the plane of the base 2. The turns of the spiral springs 5 are radially spaced apart thereby to permit appreciable radial and axial displacement of the inner ends of the springs. Preferably the springs 5 are rather highly damped. For this purpose the springs illustrated in the drawing are of laminated structure, being formed of two or more flat strips of spring material of different thicknesses coiled together in flatwise engaging relation and fixed together only at their end points. Since the two laminations of each spring have the same length but different thicknesses they have different cross sectional areas and consequently they have different resonant frequencies. For example, the outer of the two laminations which is the thicker may have a natural frequency of approximately 60 cycles per second and the thinner inner lamination may have a natural frequency of approximately 80 cycles per second. Hence, if the inner lamination tends to become resonant with an impressed vibration of the same frequency as its own natural frequency, the outer lamination, owing to its different natural frequency will act as a snubber to damp out and thereby suppress resonant vibration of the inner lamination. Similarly, if the outer lamination tends to become resonant to impressed vibrations of the same frequency as its own natural frequency, the inner lamination will act as a snubber to damp out and thereby suppress resonant vibration of the outer lamination. Thus, owing to the friction of each lamination on the other, the spring is effectively damped and prevented from transmitting vibrations to the body 1 which would result from becoming resonant to impressed vibrations. In addition further damping may be provided if desired by fitting over the spring a tight sleeve 6 formed of woven or braided metal strands, such as illustrated at Fig. 3.

The spiral springs 5 are disposed with their inner ends lying in a single common plane parallel to the plane of the base 2. A supporting platform 7 is disposed between the springs 5 and mounted upon the coplanar inner ends of the springs by means of a plurality of hanger brackets 8. The control device 1 is fixed to the supporting platform 7 in such a position that the center of gravity c of the control device is substantially equidistant from the coplanar inner ends of the supporting springs 5. Moreover the platform 7 is sufficiently below the plane of the centers of the springs 5 so that the center of gravity of the control device 1 lies substantially in the plane of these centers. It will be further noted that the springs 5 are sufficiently spaced apart so that the control device 1 lies substantially wholly within an area defined by lines drawn between the coplanar centers of the supporting springs 5. With the springs 5 so disposed, there is no unbalanced moment of the mass about the center of any spring 5, and no tendency for the mass to support a torsional oscillation in any plane.

The hanger brackets 8 are disposed on the inner sides of and immediately adjacent the associated fixed brackets 3, so that the fixed brackets 3 act as limiting stops for lateral displacement of the supporting platform 7 in directions axial of the spiral springs 5. In addition, each hanger bracket 8 is provided at its lower end with a stop pin 9 which extends axially into the circular aperture in the associated fixed bracket 3. The stop pins 9 engage the sides of these circular apertures to limit displacement of the supporting platform 7 in any direction radial with respect to the spiral springs 5. The rubber grommets 4 serve to cushion the limiting stops in all directions.

In order to ensure that the resilient mount shall be equally effective regardless of the position in which the base 2 is disposed, the spiral springs 5 are so dimensioned in regard to width, length, thickness and number of turns that they demonstrate substantially the same deflection in any one of three mutually perpendicular directions, i. e. axially or radially, upon application of any predetermined force to their inner ends. As previously noted, regardless of the position in which the base 2 is disposed, there is no unbalanced moment of the center of gravity c of the supported mass 1 with respect to the center of any one of the spiral springs 5. Accordingly, therefore, there is no tendency for torsional oscillation of the supported mass 1 in any position of mounting of the fixed base 2, and linear oscillation of the mass in any direction is substantially equally damped regardless of the position in which the base 2 is mounted.

It will now be evident that, if desired, the movable platform 7 could be supported at three points, using only three springs, or at any number of points greater than three, a four point support being shown only by way of example. At least three points of support are necessary in order to stabilize the platform against rotation about an axis joining any two points of support.

While I have described a preferred embodiment of my invention by way of illustration, many modifications will occur to those skilled in the art. I, therefore, wish to have it understood that I intend in the appended claims to cover all such modifications as fall within the true spirit and scope of my invention.

What I claim as new and desire to secure by Letters Patent of the United States is:

1. A resilient mounting for protecting a body from shock and vibration comprising a base, a plurality of open coil spiral springs, each in its unstressed condition having all its convolutions disposed in a single plane and each having its outer end mounted on said base, said springs having their inner ends disposed in a common plane, each of said springs having substantially the same resistance to deflection in any one of three mutually perpendicular directions upon application of a force to its said inner end, and means mounted on said inner ends for supporting said body with the center of gravity of said body substantially in said common plane and substantially equidistant from said inner ends of said springs.

2. A resilient mounting for protecting a body from shock and vibration comprising a base, a plurality of spiral springs each having one end mounted upon said base and each in its unstressed condition having all its convolutions disposed in a single plane substantially perpendicular to said base, said spiral springs having their opposite ends lying substantially in a common plane and each said spring having substantially the same resistance to deflection in any one of three mutually perpendicular directions upon application of a predetermined force to its said opposite end, and means for mounting said body upon said opposite ends of said springs with the center of gravity of said body substantially in said common plane and substantially equidistant from said opposite ends of said springs.

3. A resilient mounting for protecting a body from shock and vibration comprising a flat base, four open coil spiral springs rectangularly disposed on said base, each having all its convolutions disposed in a single plane substantially perpendicular to the plane of said base, said springs each having its outer end mounted upon said base and having their inner ends disposed to lie in a common plane, each said spring having substantially the same resistance to deflection in any one of three mutually perpendicular directions upon application of a predetermined force to its said inner end, and means for mounting said body upon said inner ends of said springs and substantially wholly within the rectangular area defined by said springs with the center of gravity of said body lying substantially in said common plane and substantially equidistant from said inner ends of said springs.

4. A resilient mounting for protecting a body from shock and vibration comprising a base, a plurality of planar open coil spiral springs having their outer ends mounted on said base and their inner ends disposed in a common plane and each spring in its unstressed condition having all its convolutions disposed in a single plane substantially perpendicular to said base, each of said springs having substantially the same resistance to deflection in any one of three mutually perpendicular directions upon application of a force to its said inner end, and each spring comprising a plurality of laminations fastened together only at their ends and of different cross sectional areas to cause said laminations to have different natural frequencies to provide effective damping of said spring, and means for mounting a body on said inner ends of said springs with the center of gravity of said body disposed substantially in said common plane and substantially equidistant from said inner ends of said springs.

5. A resilient mounting for protecting a body from shock and vibration comprising a base, a plurality of planar open coil spiral springs having their outer ends mounted on said base and their inner ends disposed in a common plane and each spring in its unstressed condition having all its convolutions disposed in a single plane substantially perpendicular to said base, each of said springs having substantially the same resistance to deflection in any one of three mutually perpendicular directions upon application of a force to its said inner end, and each spring comprising a pair of laminations fastened together only at their ends and having different thicknesses to cause said laminations to have different natural frequencies to provide effective damping of said spring, additional damping means comprising a braided metallic sleeve snugly sheathing the laminations of each of said springs, and means for mounting a body on said inner ends of said springs with the center of gravity of said body disposed substantially in said common plane and substantially equidistant from the inner ends of said springs.

References Cited in the file of this patent

UNITED STATES PATENTS

| Number | Name | Date |
|---|---|---|
| 1,526,882 | Trimmer | Feb. 17, 1925 |
| 1,798,846 | Kennedy | Mar. 31, 1931 |
| 1,881,997 | Browne | Oct. 11, 1932 |
| 2,035,882 | Hansson | Mar. 31, 1936 |
| 2,060,604 | Bartlett | Nov. 10, 1936 |
| 2,063,063 | Trott et al. | Dec. 8, 1936 |
| 2,063,064 | Trott et al. | Dec. 8, 1936 |
| 2,166,326 | Riesz | July 18, 1939 |
| 2,243,679 | Overstrom | May 27, 1941 |
| 2,397,804 | Nakken et al. | Apr. 2, 1946 |
| 2,538,955 | Efromsom et al. | Jan. 23, 1951 |
| 2,600,090 | Barber et al. | June 10, 1952 |
| 2,626,799 | Howell | Jan. 27, 1953 |